ID-3,477,968
COLD SELF-VULCANIZING RUBBER
COMPOSITIONS
Jean-Marie Massoubre, Clermont-Ferrand, France, assignor to Compagnie Generale des Etablissements Michelin, raisons sociale Michelin & Cie, Clermont-Ferrand, France
No Drawing. Filed June 10, 1965, Ser. No. 463,004
Claims priority, application France, June 12, 1964, 1,806
Int. Cl. C08c 9/10, 11/54
U.S. Cl. 260—4
4 Claims

ABSTRACT OF THE DISCLOSURE

A cold self-vulcanizing rubber composition for repairing injured parts in rubber articles, particularly tires, which comprises an admixture prepared just before use of two and preferably three storable components each of which has a plasticity defined at 20° C. by a Williams number between about 2.5 and 5 and is substantially free of any volatile material; the first component comprising a mixture of a partially depolymerized natural rubber, sulfur and a fixed plasticizer; the second optional component comprising a mixture of a partially depolymerized natural rubber, a vulcanization activator and a fixed plasticizer; and the third component comprising a vulcanization ultra-accelerator admixed with either polyisobutylene and a fixed plasticizer or polyisobutylene and polyethylene.

---

This invention relates to self-vulcanizing compounds for repairing rubber articles such as, for example, pneumatic tire casings and the like, and it relates more particularly to cold self-vulcanizing patching and repair compounds or compositions which are prepared by mixing together separate components preliminary to and shortly before use in making repairs.

Cold self-vulcanizing or self-hardening patching compounds for rubber articles are well known. Usually the cold self-vulcanizing patching compounds are composed of two separate components which are mixed immediately before use. One of the components usually contains sulfur, while the other component contains a vulcanizing accelerator. Both of the components contain a vulcanizable elastomer and one or both of them may include other rubber constituents such as zinc white, antioxidants, carbon black, fillers, plasticizers and a volatile solvent to render the material sufficiently plastic to enable the mixing of the two components prior to use. Also, for cold self-vulcanizing purposes, one of the components usually contains a vulcanization activator. These self-vulcanizing compounds, while satisfactory in some circumstances, are not free of disadvantages. A major disadvantage is that the period during which the separate components or mixtures can be stored and preserved is limited. Segregation of the sulfur from the vulcanization accelerator by including them in separate components or mixtures will not preserve the components indefinitely. The component containing the accelerator will react with the rubber in the component in a manner similar to vulcanization over a period of time with the result that this component hardens and can no longer be mixed with the other component. The self-vulcanizing action is accelerated if the vulcanization activator is included in the component which contains the vulcanization accelerator. If the vulcanization activator is included in the component containing the sulfur, the activator will, in a manner similar to the accelerator, cause a slow vulcanization of that component which either renders it completely useless or renders any mixture of the components unsatisfactory.

The presence of the volatile solvent in the components to keep them relatively plastic introduces another problem. If the area to be repaired is quite shallow, requiring only a thin layer of the mixed two-component patching material, the solvent can evaporate quickly and readily. On the other hand, if the injury in the rubber article is deep requiring a thick application of the patching compound, the solvent can be eliminated only with difficulty. It evaporates slowly, causes shrinking of the patching material and forms pores and bubbles within the mass of the patching material in the damaged area which thereby reduces the effectiveness of the repair.

In accordance with the present invention, a cold self-vulcanizing compound prepared by mixing together separately prepared components is provided which overcomes the disadvantages of the prior multiple-component patching materials. More particularly, in accordance with the present invention, a multiple-component self-vulcanizing repair or patching material is provided which is devoid of volatile solvents and in which the sulfur, vulcanization accelerator and vulcanization activator are contained in separate components all of which are plastic and in a form enabling them to be mixed readily to form a satisfactory patching or repair material which is usable for the repair of deep cuts, breaks or tears in all types of rubber articles, and especially in tire casings.

As used hereinafter, the term "elastomer" means any natural or synthetic rubber or mixtures thereof compatible with the elastomers customarily used in the manufacture of tires or tire casings.

The term "partially depolymerized elastomer" means an elastomer in which the molecular chains have been shortened by mechanical working, oxidation or peptization or a combination of the same.

The term "fixed plasticizer" is a plasticizer such as mineral oil, sulphonated mineral oils or the like which is compatible with the elastomer and can exist without change in admixture with the elastomer.

For best results the new self-vulcanizing repair material is prepared by mixing together three separate or individual components, two of which comprise a partially depolymerized elastomer and a fixed plasticizer in such ratio that the components have a Williams plasticity at 20° C. between 2.5 and 5, and optimally between 3.5 and 4. (Standardized ASTM method D926-56, measured with the Williams parallel plate plastometer.)

The plasticity of the components containing the partially depolymerized elastomer and fixed plasticizer is such as to enable the several separate components of the repair material to be mixed readily without special skill or equipment. It should be understood that depolymerization of the elastomer should not be carried to the extent that the mechanical qualities desired after vulcanization are injured in the final compound.

Vulcanizing accelerators are of the super or ultra-accelerator types, such as dithiocarbamates, thiuram mono-or disulphides, thiazoles, xanthates and the like. Vulcanization activators can be included in one of the components. Conventional vulcanizing activators, such as, zinc oxide, zinc-fatty acid compounds or auxiliary accelerators such as a thiazol or a thiuram or a basic reaction compound such as an amine are suitable.

When an activator is used, it should be in a separate component so that it does not come in contact with the other active agents, prior to mixing the components. In a preferred example of the invention, one individual component of the repair or patching material will contain sulfur, a second component will contain an ultra-accelerator while a third component will contain a vulcanization activator. The partially depolymerized elastomer and fixed plasticizer are included in the components containing the sulfur and vulcanization activator, while the ultra-accelerator will be associated in the third component with a material which is not vulcanizable, such as, for example, polyisobutylene of a molecular weight, for example, about 100,000 to 150,000, polyethylene to decrease the plasticity of the polyisobutylene, if necessary, and a petroleum plasticizer. The components containing the partially depolymerized elastomer can also contain fillers, carbon black, antioxidants and the like, as in conventional rubber practice. By suitably compounding the individual components, they can be given essentially the same plasticity so that they can be readily mixed prior to use and then applied in relatively massive amounts to make deep repairs without danger of forming of bubbles, pores, or causing shirnking of the patching compound in the repair area. To facilitate mixing of the separate components, they can be warmed, for example, from 40 to 50° C. to soften them.

A good bond between the patching or repairing material and the surfaces of the articles being repaired can be assured by coating the damaged area with a conventional rubber cement or by dissolving a portion of the new repair compound in a volatile solvent to form a rubber cement. The cement is applied in a thin film and allowed to dry to a tacky state before application of the plastic patching or repair material to the coated surface. Due to the self-vulcanizing characteristics of the completely mixed patching or repair material, it will vulcanize completely in a maximum of 120 hours at a temperature of 20° C. Vulcanization can be accelerated by warming the repair area. At a temperature of 80° C., vulcanization can be completed within an hour's time.

By way of example of a typical embodiment of the invention, the new patching and repair material may be composed of three separately prepared components as set forth in the following table.

TABLE I

|  | Mixture A | Mixture B | Mixture C |
| --- | --- | --- | --- |
| Depolymerized rubber | 100 | 100 | Polyisobutylene, 100. |
| Zinc white | 5 | 5 | Petroleum plasticizer, 20. |
| Antioxidant | 1 | 1 | Dibutyl dithiocarbamate of zinc, 80. |
| Carbon black | 50 | 20 |  |
| Kaolin |  | 40 |  |
| Petroleum plasticizer | 30 | 20 |  |
| Sulfur | 3 |  |  |
| Mercapto benzothiazol |  | 0.5 |  |

NOTE.—All parts are by weight.

Mixtures A and B contain partially depolymerized natural rubber which is rendered plastic by mechanically working it, for example, in a rubber mill and the addition of a fixed petroleum plasticizer. Both of Mixtures A and B contain zinc white, antioxidant, carbon black, and petroleum plasticizer while Mixture B also contains a clay filler.

The antioxidant used is phenyl betanaphthylamine.

The petroleum plasticizer is a mineral oil.

Sulfur required for vulcanization is present in Mixture A, while a vulcanization accelerator, mercapto benzothiazol, is present in Mixture B. Only Mixtures A and B contain a vulcanizable elastomer. Mixture C contains a non-vulcanizable elastomer, polyisobutylene (100,000 molecular weight), a vulcanization ultra-accelerator, dibutyl dithiocarbamate of zinc and a fixed plasticizer. Mixtures A and B have a Williams plasticity of about 3.8 at 20° C.

Inasmuch as the Mixture C does not contain any vulcanizable substances, it will last indefinitely. Mixture A which does not contain a vulcanization accelerator also has a prolonged shelf life because of the depolymerized state of the elastomer as does also Mixture B which does not contain any sulfur or an ultra-accelerator. The plasticity of the several mixtures, enables them to be mixed easily by hand or with a small mixer. The mixtures are combined before use in making repairs in the following proportions: 100 parts by weight each of Mixtures A and B and 15 parts by weight of Mixture C. This compound when used in the filling of deep injuries in tire casings and the like up to several centimeters in depth becomes completely vulcanized in about 120 hours at a temperature of about 20° C. As indicated above, by heating the area of the repair to a higher temperature, the vulcanization time can be shortened to as little as one hour.

Another example of a three-component patching or repair material is set forth in the following table.

TABLE II

|  | Mixture A | Mixture B | Mixture C |
| --- | --- | --- | --- |
| Peptized rubber | 100 | 100 | Polyisobutylene, 80. |
| Zinc white | 5 | 5 | Polyethylene, 20. |
| Antioxidant | 1 | 1 | Dibutylxanthate of zinc, 80. |
| Carbon black | 45 | 45 | Kaolin, 20. |
| Cumaronic plasticizer | 10 | 10 |  |
| Petroleum plasticizer | 10 | 10 |  |
| Dibutylamine |  | 2 |  |
| Sulfur | 4 |  |  |

The ingredients of this repair material are similar to those set forth in Table I with the following differences. The rubber used is a natural rubber, partially depolymerized by mechanical working and peptization with diorthobenzamidophenyl disulfide. The plastizers, ultra-accelerator (dibutylxanthate of zinc) and the activator (dibutylamine) are different. In Mixture C, the polyisobutylene is of a higher molecular weight and polyethylene wax is included in order to decrease the viscosity of the material. The Williams viscosity of the three mixtures is essentially the same as in Table I, and the several components (A, B and C) are mixed together in the same ratios to obtain a cold self-vulcanizing compound having essentially the same properties as the composition disclosed in Table I. Inasmuch as, in each instance, the components or mixtures A, B and C are pastes, they can be packaged in such a manner as to facilitate greatly their use. Thus, each component may be made in the form of separate sheets, plates or strips of the same surface area but of different thicknesses corresponding to the proportions in which they are to be mixed. For example, sheets or plates made of Mixtures A and B can be approximately one centimeter thick, while the sheet made of Mixture C is about 1.5 millimeters thick. By mixing the three sheets, they are present in the repair compound in the correct proportions. If smaller quantities are required, sections of equal area can be cut from the sheets, strips or plates while maintaining the desired proportions of the three components. The sheets can be covered with strippable films of polyethylene or the like, or the sheets may be packaged in small envelopes or capsules in the proportions generally indicated above. It is, of course, possible also to provide the components in collapsible tubes which are proportioned in size and from which equal portions of Mixtures A and B can be dispensed, together with a smaller portion of Mixture C from a proportionally smaller tube. In this way, the compound can be prepared readily without need for measuring quantities of the several components.

As indicated above, the patching compound can be dissolved in a volatile solvent to make rubber cement for use in thin films or in treating the surfaces of a deeply damaged area to condition the area for patching with the new repair or patching material.

The use of partially depolymerized elastomers to impart the necessary plasticity to the separate components of the repair or patching material makes unnecessary the use of volatile solvents and in that way formation of bubbles or pores in the repair area is avoided. Moreover, by completely separating the sulfur-containing component from the ultra-accelerator component and separating the vulcanization activator from the sulfur and vulcanization ultra-accelerator, the individual components have an almost indefinite shelf life.

In a further example of a patching or repair material according to the invention, the depolymerized or peptized natural rubber in the preceding examples is replaced by a depolymerized or peptized synthetic polyisoprene having substantially the same plasticity. The compound obtained by mixing the three mixtures A, B and C vulcanizes under substantially the same conditions as the compounds obtained on the basis of natural rubber.

In a still further example, low molecular synthetic rubber of the SBR type is substituted for the peptized natural rubber in mixture A of Table II. This synthetic rubber can be obtained by submitting conventional commercial SB Rubber to a thorough mastication. Preferably, it can also be obtained by limiting the degree of polymerization. The molecular weight is chosen so as to achieve a Williams plasticity of between 3.5 and 4.0 for mixture A. The compound thus obtained vulcanizes at room temperature but requires more time than in the preceding examples.

In al the preceding examples it is possible to use, at least partially, reclaimed natural or synthetic rubbers for compounding the mixtures A, B and C, i.e. devulcanized elastomers, provided the devulcanization and depolymerization have been carried out far enough to obtain mixtures having the desired plasticity.

It will be understood that the examples given above are susceptible to modification in the proportions of fillers, carbon black, antioxidants and the like, and other components commonly used in rubber goods may be included as desired. Accordingly, the examples given above should be regarded as illustrative and the invention is not limited to them except as defined in the following claims.

I claim:

1. A cold self-vulcanizing rubber composition for repairing injured parts in rubber articles which comprises a fresh admixture of at least two storable components A and C, component A comprising a mixture of a partially depolymerized natural rubber, sulfur, and a non-volatile mineral oil plasticizer; component C comprising a mixture selected from the group consisting of (1) polyisobutylene, a non-volatile mineral oil plasticizer and a dithiocarbamate or xanthate vulcanization ultra-accelerator and (2) polyisobutylene, polyethylene and a dithiocarbamate or xanthate vulcanization ultra-accelerator; each of said components A and C having a plasticity defined at 20° C. by a Williams number between about 2.5 and 5 and being substantialy free of any volatile material; component A constituting a major part by weight and component C constituting a minor part by weight of the composition.

2. A cold self-vulcanizing rubber composition for repairing injured parts in rubber articles which comprises a fresh admixture of three storable components A, B and C, component A comprising a mixture of a partially depolymerized natural rubber, sulfur and a non-volatile mineral oil plasticizer; component B comprising a mixture of a partialy depolymerized natural rubber, a thiazole or amine vulcanization activator, and a non-volatile mineral oil plasticizer; component C comprising a mixture selected from the group consisting of (1) polyisobutylene, a non-volatile mineral oil plasticizer and a dithiocarbamate or xanthate vulcanization ultra-accelerator and (2) polyisobutylene, polyethylene and a dithiocarbamate or xanthate vulcanization ultra-accelerator; each of said components A, B and C having a plasticity at 20° C. by a Williams number between about 2.5 and 5 and being substantially free of any volatile material; components A and B constituting a major part by weight and component C constituting a minor part by weight of the composition.

3. The cold self-vulcanizing rubber composition for repairing injured parts in rubber articles as defined by claim 2 wherein said components A, B and C are in the form of separate sheets having substantially equal surface areas but of different thicknesses corresponding to the proportions in which they are admixed.

4. A cold self-vulcanizing rubber composition for repairing injured parts in rubber articles which comprises a fresh admixture of a partialy depolymerized natural rubber, polyisobutylene, a non-volatile mineral oil plasticizer, sulfur and a dithiocarbamate or xanthate vulcanization ultra-accelerator; said admixture having a plasticity defined at 20° C. by a Williams number between about 2.5 and 5 and being substantially free of any volatile material.

References Cited

UNITED STATES PATENTS

| 2,534,883 | 12/1950 | Smyers | 260—4 |
| 9,653,924 | 9/1953 | Olin | 260—4 |
| 2,903,437 | 9/1959 | Van Epp | 260—888 |
| 3,039,509 | 6/1962 | Gruber | 260—4 |
| 3,076,777 | 2/1963 | Zeolla et al. | 260—888 |
| 3,160,595 | 12/1964 | Hardman et al. | 260—4 |

FOREIGN PATENTS 806,198  12/1958  Great Britain.

MURRAY TILLMAN, Primary Examiner

M. J. TULLY, Assistant Examiner

U.S. Cl. X.R.

152—367; 260—2.3, 28.5, 30.8, 33.6, 41.5, 45.9, 94.7, 757, 759, 785, 795, 888, 889, 897